United States Patent
Bradshaw

[11] Patent Number: 5,961,779
[45] Date of Patent: *Oct. 5, 1999

[54] LAMINATING AND ADHESIVE TRANSFER APPARATUS

[75] Inventor: Franklin C. Bradshaw, Scottsdale, Ariz.

[73] Assignee: Xyron, Inc., Scottsdale, Ariz.

[*] Notice: This patent is subject to a terminal disclaimer.

[21] Appl. No.: 08/989,513

[22] Filed: Dec. 12, 1997

Related U.S. Application Data

[63] Continuation of application No. 08/748,982, Nov. 14, 1996, Pat. No. 5,735,998, which is a continuation of application No. 08/354,222, Dec. 12, 1994, Pat. No. 5,584,962, which is a continuation-in-part of application No. 08/247,003, May 30, 1994, Pat. No. 5,580,417.

[51] Int. Cl.⁶ .................................................. B32B 31/00
[52] U.S. Cl. ........................ 156/495; 156/522; 156/555; 100/176; 242/156; 242/419.9
[58] Field of Search ..................... 156/495, 522, 156/555; 100/176; 242/156, 419.9

[56] References Cited

U.S. PATENT DOCUMENTS

| | | | |
|---|---|---|---|
| 2,647,299 | 8/1953 | Thomas | 492/47 X |
| 3,027,285 | 3/1962 | Eisner et al. | 156/522 X |
| 3,309,983 | 3/1967 | Dresser | 156/555 X |
| 3,737,359 | 6/1973 | Levitan | 156/522 |
| 3,799,829 | 3/1974 | Heatwole | 156/235 |
| 3,901,758 | 8/1975 | Humphries | 156/499 |
| 3,944,455 | 3/1976 | French | 156/361 |
| 4,090,911 | 5/1978 | Shaffer | 156/499 |
| 4,151,900 | 5/1979 | Kirwan | 188/174 |
| 4,295,921 | 10/1981 | Bopst, III | 156/577 |
| 4,387,000 | 6/1983 | Tancredi | 156/555 X |
| 4,425,182 | 1/1984 | Jones | 156/554 |
| 4,564,411 | 1/1986 | Holzer | 156/387 |
| 4,619,728 | 10/1986 | Brink | 156/555 |
| 4,625,931 | 12/1986 | Tamura | 242/68.3 |
| 5,139,600 | 8/1992 | Singer | 156/301 |
| 5,163,349 | 11/1992 | Takagi et al. | 156/510 X |
| 5,279,697 | 1/1994 | Peterson et al. | 156/368 |
| 5,295,753 | 3/1994 | Godo | 400/612 |
| 5,480,509 | 1/1996 | Matsuo | 156/522 |
| 5,580,417 | 12/1996 | Bradshaw | 156/495 |
| 5,584,962 | 12/1996 | Bradshaw et al. | 156/495 |
| 5,735,998 | 4/1998 | Bradshaw | 156/495 |

FOREIGN PATENT DOCUMENTS

| | | |
|---|---|---|
| 3030179A1 | 3/1982 | Germany . |
| 1189956 | 4/1970 | United Kingdom . |
| 1280015 | 7/1972 | United Kingdom . |
| 2126389 | 3/1984 | United Kingdom . |
| 2199010 | 6/1988 | United Kingdom . |
| 2230250 | 10/1990 | United Kingdom . |

*Primary Examiner*—James Sells
*Attorney, Agent, or Firm*—Pillsbury Madison & Sutro LLP

[57] ABSTRACT

A multi-purpose laminating and adhesive transfer apparatus having a frame supporting rotatably engaging nip rollers. A replaceable cartridge is insertable into the frame and has upper and lower feed rolls which may be a laminate, film or paper, or an adhesively coated film or a film having an affinity for adhesive. The upper and lower feed rolls containing the webs of laminating or adhesive transfer material have tensioning caps which can be adjusted to provide the proper tensioning to prevent the rollers from overrunning as they rotate. Tensioning caps and the cartridges are pre-set and provided to the user. A cutter blade is positioned at the discharge side of the nip rollers and may be actuated to sever the master at any desired location. The apparatus may be operated to apply lamination to either top or bottom surfaces of a substrate or an adhesive to the top or bottom surface of the substrate or to both surfaces.

19 Claims, 4 Drawing Sheets

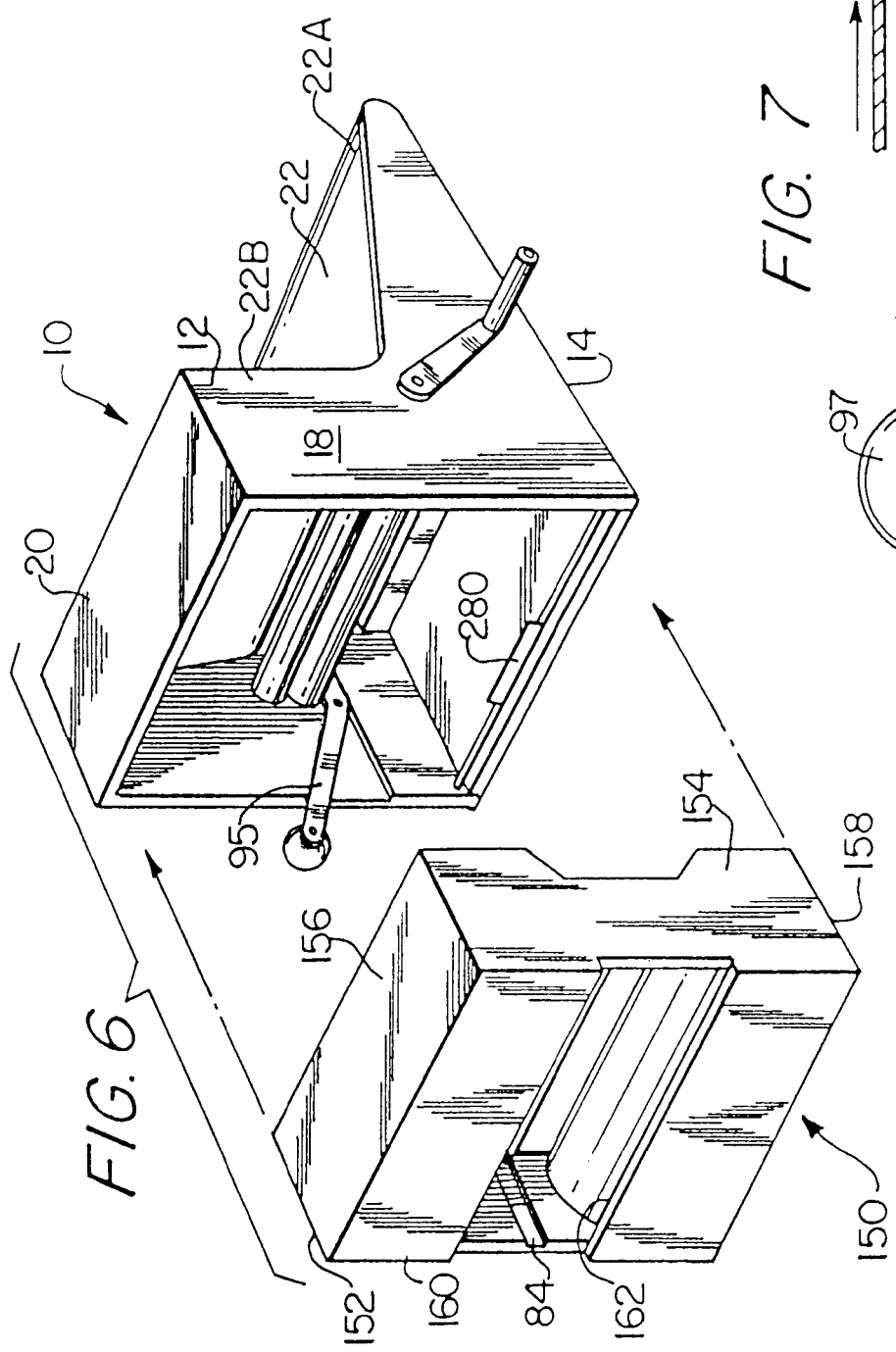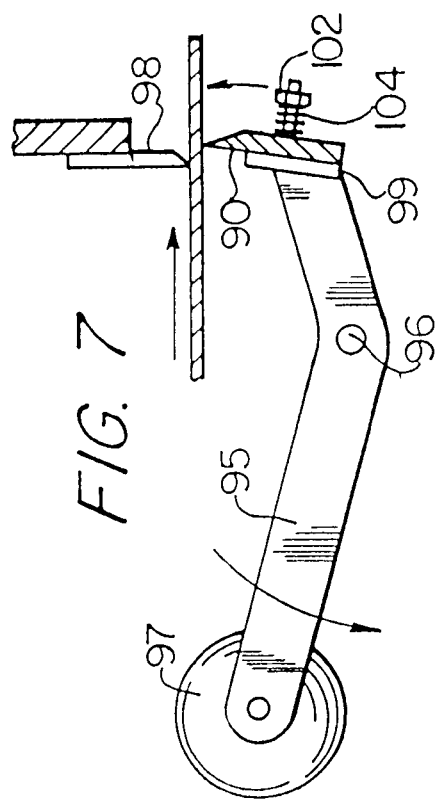

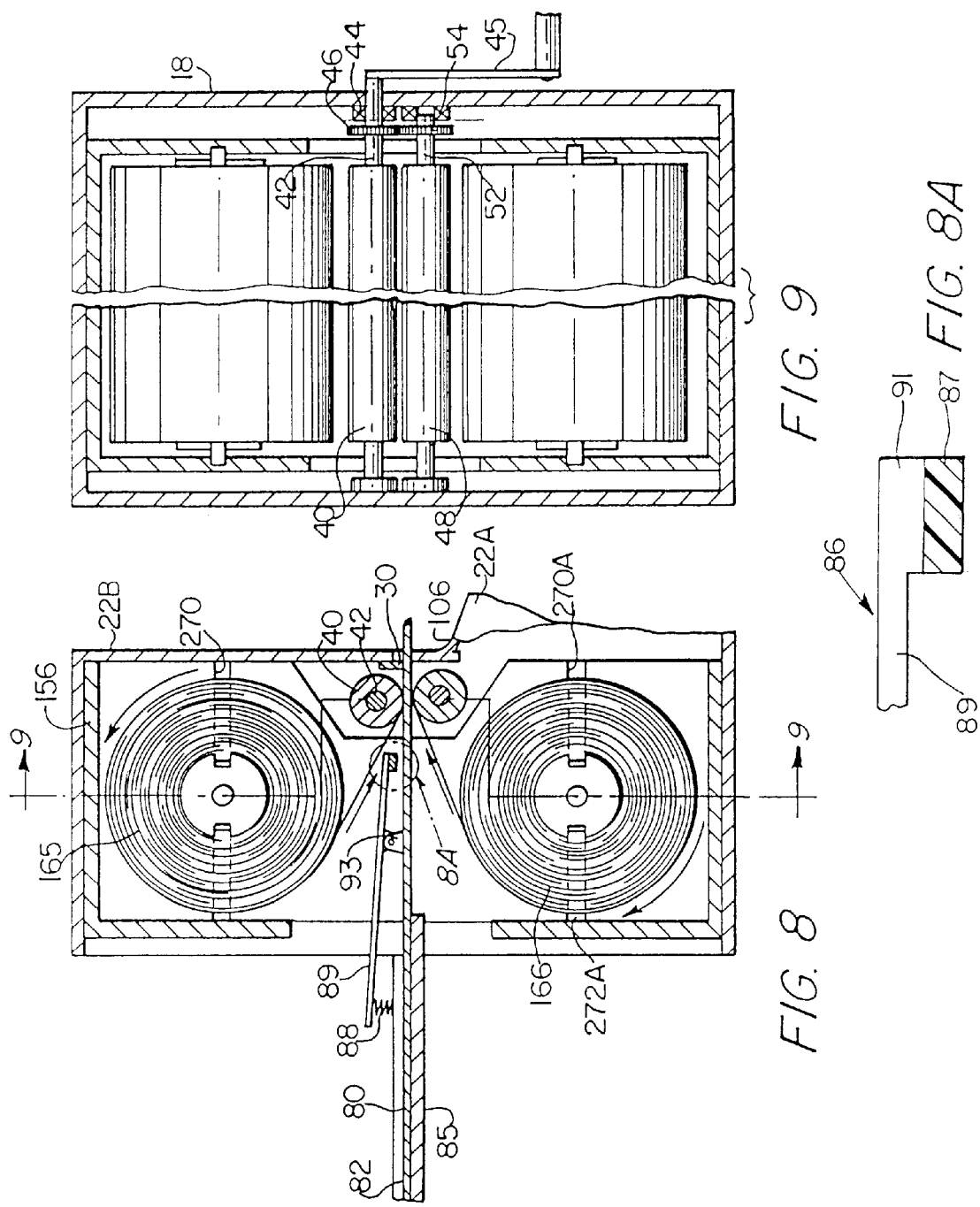

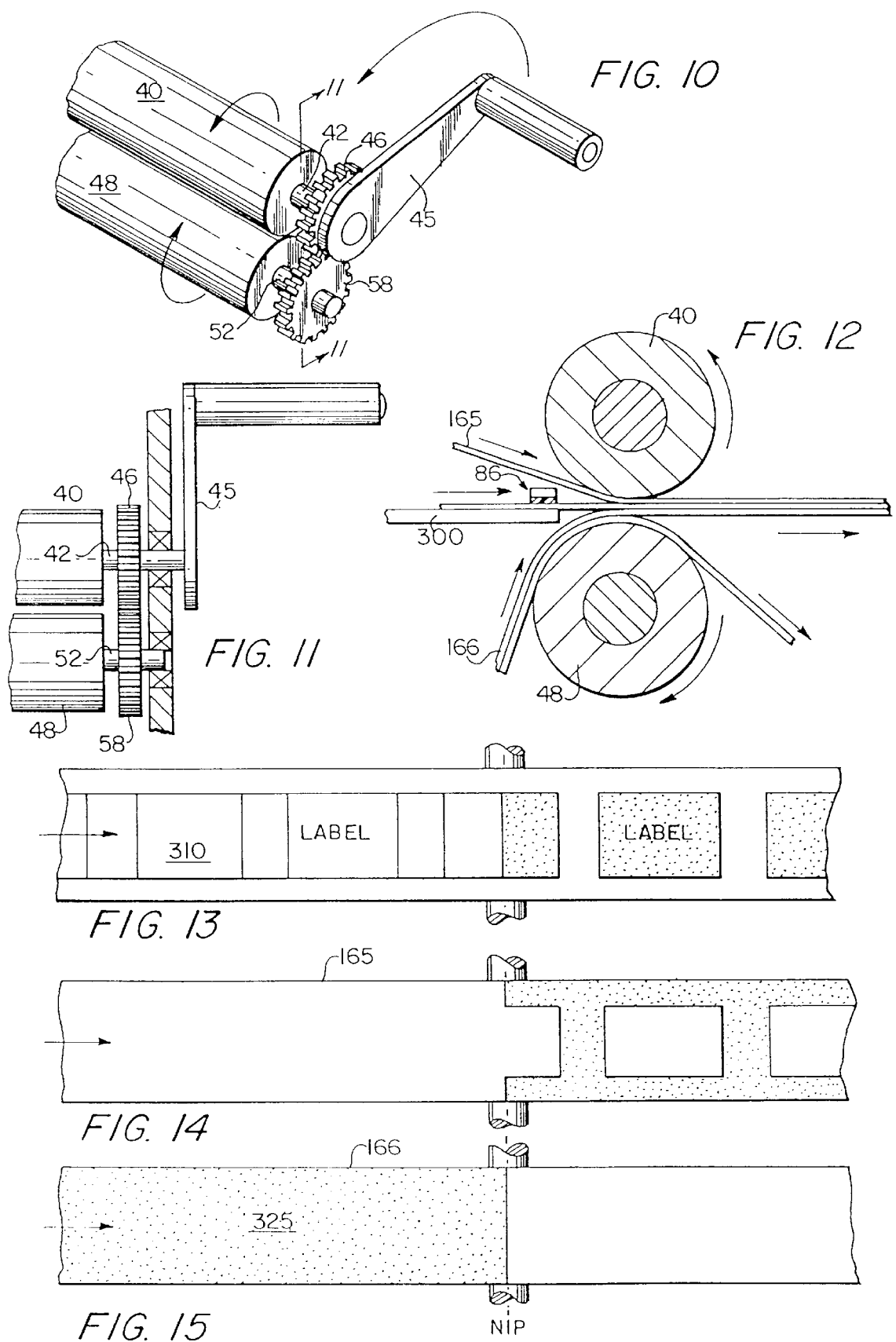

LAMINATING AND ADHESIVE TRANSFER APPARATUS

FIELD OF THE INVENTION

The present invention relates to an apparatus for laminating items and which apparatus will also transfer adhesives to substrates for purposes of producing articles such as labels and stickers. This application is a continuation of application Ser. No. 08/748,982, filed Nov. 14, 1996, now U.S. Pat. No. 5,735,998, which is a continuation of application Ser. No. 08/354,222, filed Dec. 12, 1994, now U.S. Pat. No. 5,584,962, which is a continuation-in-part of application Ser. No. 08/247,003, filed May 30, 1994, now U.S. Pat. No. 5,580,417, all of which are incorporated herein by reference in their entireties.

BACKGROUND OF THE INVENTION

It is common practice to protect documents and other items such as cards by encasing them in clear plastic coverings. Various products known as protectors are available for this purpose. Another common way of protecting documents and similar items is to laminate them. Lamination involves sealing the document or item between oppositely applied transparent films and lamination is commonly applied to such items as driver's licenses, identification cards, membership cards and the like.

Another operation that is often applied to documents and papers is that of adhesive transfer. Adhesive transfer is an operation that is used to make articles such as labels and stickers. One manner of producing such labels is to print the labels on blanks provided for this purpose. The blanks generally have an adhesive backing and are secured to a liner from which they may be peeled at the time of use. Computer systems are available that have the capability of printing labels on liner label stock provided for this purpose. This manner of making labels or stickers is expensive and further is limiting in that the printed material must be adapted to the physical size or confines of the label or sticker carried on the liner. This limits the information and creativity that may be incorporated in label making.

Based on the foregoing, there exists a need for a simple multi-purpose apparatus which can both serve to apply laminates to documents and papers and which will also serve to apply adhesive, including dry adhesives, to materials of various sizes so a wide variety of labels and stickers may be produced. The apparatus of the present invention can apply clear plastic laminates to master substrates of various sizes and can also transfer adhesive to substrates of various sizes not being limited by length. Adhesive transfer can be applied to either surface of the item as required. The apparatus can also apply dry adhesives from double sided release coated liners to a substrate.

SUMMARY OF THE INVENTION

Briefly, in accordance with the present invention, a multi-purpose laminating and adhesive transfer apparatus is provided which has a frame or housing with mounting means for receiving a cartridge which is insertable to supply material to perform the necessary laminating or adhesive transfer operation. The cartridge has a box-like housing in which upper and lower supply rolls containing webs of laminating or adhesive transfer material are rotatively secured. The rolls have tensioning caps which can be adjusted to prevent the supply rolls from overrunning as they pay-out material. The caps are pre-set in accordance with the operation being performed and the characteristics of the material. The tensioning caps may be pre-set by the material supplier at the time they are inserted into the cartridge. The user selects the cartridge appropriate to the operation to be performed.

First and second nip rollers extend transversely in the housing at a location intermediate the cartridge supply rollers. The nip rollers have a resilient coating and engage one another or are slightly spaced-apart in parallel relationship to one another. Preferably the lower nip roller is displaced forwardly from the upper nip roller in the direction of the cartridge. An actuator, which may be powered or may be manual such as a hand crank, is provided for driving or rotating at least one of the nip rollers which, in turn, drives the other roller.

A feed tray is removably mountable to the housing to facilitate feeding the article to be processed. Preferably the feed tray is removably secured in a general horizontal location aligned with the nip. The feed tray carries a transversely extending guide and wiper which smooths, cleans and positions the master fed along the tray. A discharge opening is provided at the rear of the housing and a cutter blade extends transversely across the housing adjacent the discharge. The cutter blade may be manually actuated by a lever to upwardly sever the substrate at a desired location in conjunction with an anvil bar.

By way of example, the lower feed roll may comprise a flexible film with an adhesive coating. The upper feed roll comprises a supply of film which has an affinity for adhesive. The upper and lower films are fed between the nip rollers. The tray is placed in position and a pre-printed master such as a master containing labels repetitively printed on a sheet can be fed via the tray to the interface between the nip rollers passing between the tray surface and the wiper. Adhesive will be transferred from the bottom film to the labels with excessive adhesive being picked up by the top film. The labels are now provided with an adhesive and are attached to the lower film and may be severed from one another by the cutting blade at the discharge opening. The labels may be peeled from the film substrate when used.

Accordingly, it is a primary and broad object of the present invention to provide a simple and efficient laminating or adhesive transfer device in which cartridges containing various types of films can be easily and selectively inserted for use in performing various laminating and adhesive transfer operations. The term "applicator and transfer apparatus" as used herein is to be understood to comprehend both adhesive transfer and laminating operations as the device both transfers laminates and adhesives to items.

BRIEF DESCRIPTION OF THE DRAWINGS

The above and other objects, advantages and features of the present invention will be more fully understood from the following description, claims and drawings in which:

FIG. 6 is a perspective view illustrating the installation of a cartridge;

FIG. 7 is a detail view of the cutter mechanism;

FIG. 8 is a side view, partly in section, showing the cartridge in place and a master being fed into the device;

FIG. 8A is a detail view of the wiper as indicated in FIG. 8;

FIG. 9 is a sectional view taken along line 9—9 of FIG. 8;

FIG. 10 is a detail view of the nip rollers;

FIG. 11 is a sectional view taken along line 11—11 of FIG. 10;

FIG. 12 is a side view showing a master being fed between the nip rollers;

FIG. 13 shows labels as they receive adhesive;

FIG. 14 is a plan view of the upper feed web showing the pick up of excessive adhesive thereon; and FIG. 15 illustrates removal of the adhesive from the lower web.

Turning now to the drawings, particularly FIGS. 1 to 11, the transfer apparatus of the present invention is generally designated by the numeral 10 and includes a housing member generally designated by the numeral 12 having a base 14, opposite side walls 16 and 18, a top 20 and a rear wall 22. The rear wall 22 of the housing is upwardly and forwardly inclined at panel 22A from the base 14 to a location where the rear wall extends vertically at panel 22B. As seen in FIG. 8, an opening 30 is defined between the panels 22A and 22B through which the substrate and processed articles are discharged.

Figure 1:
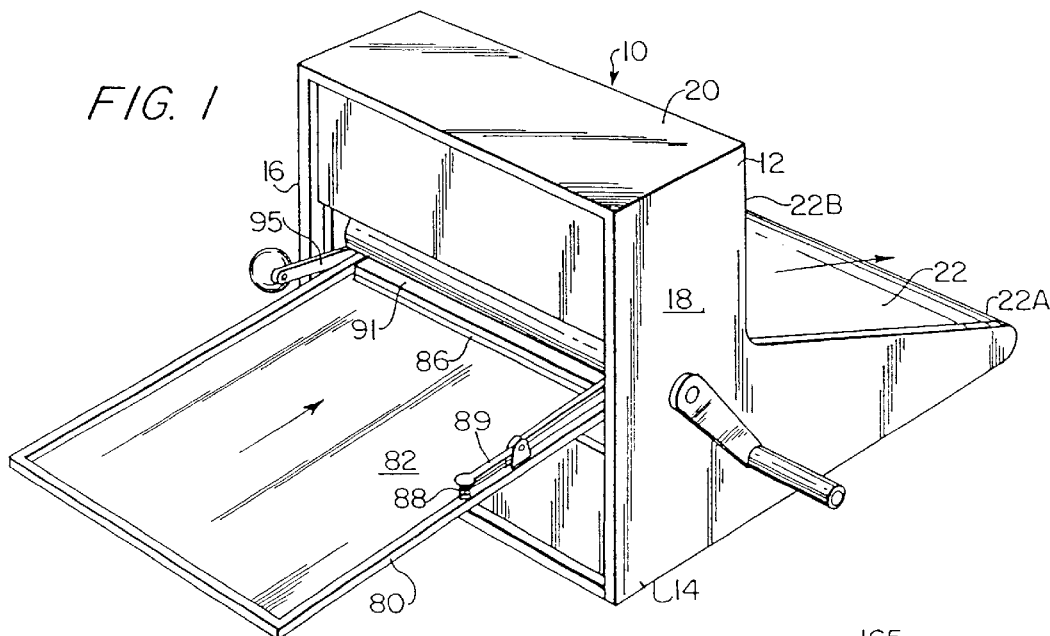
FIG. 1 is a perspective view of the transfer apparatus of the present invention.
Figure 2:
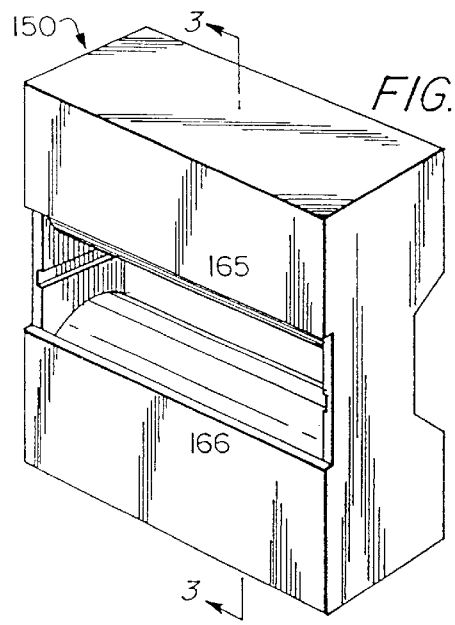
FIG. 2 is a perspective view of the supply roll containing a cartridge removed from the apparatus.

As best seen in FIGS. 8, 9 and 10, an upper nip roller 40 extends transversely between the side walls of the frame spaced rearwardly from the edge of the side walls. The upper nip roller includes an axial shaft 42 rotatable in suitable bearings or bushings 44 at opposite ends. The shaft is covered by a cylindrical roller member 43 of resilient material such as rubber. Shaft 42 extends exteriorly of the side plate and is shown carrying a hand crank 45 for manually rotating the roller and shaft Alternatively, the rollers may be powered by an electrical motor, not shown. A pinion gear 46 is secured to one end of the shaft adjacent the interior surfaces of the side wall.

A second nip roller 48 extends transversely between the side walls 16 and 18 positioned parallel to the upper nip roller. The lower nip roller may be vertically aligned with the upper nip roller but preferably is forwardly displaced a distance forward of the upper nip roller, as for example approximately ¼" as best seen in FIG. 8. The terms "forward" and "rearward" or "front" and "rear" as used herein, refer to the orientation of the feed path through the device. The lower nip roller has a shaft 52 which is rotatable in bearings 54 located at the interior of the opposite side walls. A pinion gear 58 is mounted at one end of the shaft 52. Pinion gear 58 engages the pinion gear 46 on the upper nip shaft so that actuation of the upper nip roller by means of the crank 45 or other power means will impart opposite rotation to both nip rollers as indicated by the arrows in FIG. 10.

Feed tray 80 has of a planar feeding surface 82 with opposite extending flanges 85 which flanges are removably insertable in horizontal recesses 84 of the cartridge 150. A wiper assembly 86 is mounted on the upper surface of the feed tray as seen in FIGS. 8 and 8A. The wiper has a bar 91 which extends transversely across the tray adjacent the entrance to the nip area. The bar has a pad 87 of felt or resilient or soft material such as felt, soft plastics, fabric or rubber, which lightly engages the master as it passes between the wiper and the tray surface. The wiper serves several functions and cleans, smooths and guides the master as it enters the nip between the rollers. A particularly important function of the wiper is to tension the master substrate keeping it flat and aligned with the laminate and adhesive webs resulting in better alignment especially when feeding sheets intermittently. The wiper has an arm 89 which is upwardly biased by spring 88. Arm 89 is pivotally attached to the edge of the tray at fulcrum 93 so that the wiper is pressed into light engagement with the material passing beneath the pad 87. The wiper bar 91 may be lifted to facilitate loading a master by manually depressing the outer end of the arm 89 against the force of spring 88. Preferably the pad is replaceable as required.

Referring to FIGS. 6 and 7, a blade 90 having a cutting edge extends transversely adjacent the discharge opening. The blade is movable vertically upward from a non-actuated position to a cutting position by means of lever 95 to which the blade 90 is attached. Lever 95 is pivotally secured to the interior of the housing side wall at pivot rod 96. Downward movement of the lever at handle 97 will move the blade 90 upward into engagement with anvil bar 98 which is fixed and extends transversely. Preferably, the blade 90 is mounted on a carrier 99 by means of pins 102 having compression springs 104 thereon which bias the blade toward the cutting bar. Thus, when the cutting action occurs, the flat surface of the blade moves along the anvil which provides a self-cleaning action. The upper end of panel 22A is slightly curved at 106 as seen in FIG. 8 to facilitate smooth discharge of the item being processed. The area indicated by the numeral 106 may be coated with a suitable low-frictional material such as that sold under the trademark "Teflon".

A primary advantage of the present invention is that various substrates may be provided to the user in a self-contained, ready-to-use cartridge which allows the user simply to select and insert the appropriate cartridge. As indicated above, the device of the present invention can be used for multiple purposes for adhesive transfer and lamination. Adhesive can be transferred to either surface of the master and may be a dry adhesive. The cartridge is generally designated by the numeral 150 and includes a frame having opposite side walls 152, 154, a top 156, and bottom 158. A front wall 160 defines a substantial rectangular opening 162. As shown, the cartridge includes an upper feed roll 165 and a lower feed roll 166 each containing a web of film or other flexible substrate material. A significant advantage of the present invention is that the upper and lower feed rolls are provided to the user pre-wound and properly tensioned so as not to overrun during operation and to provide proper tracking. The proper tensioning of the feed rolls is accomplished by means of a tensioning device as best seen in FIGS. 3, 4 and 5.

Figure 3:
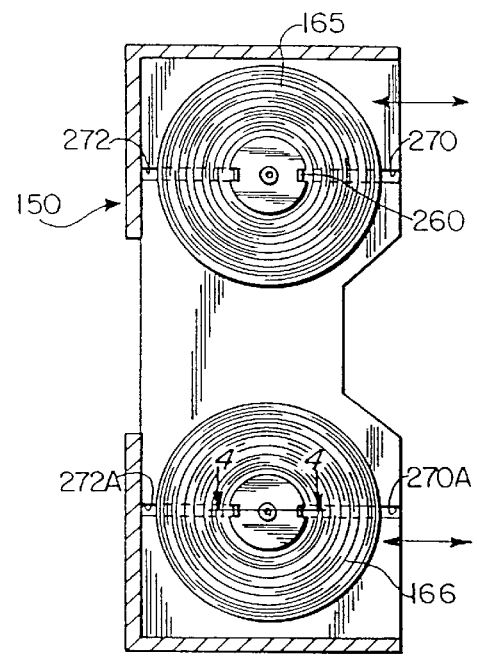
FIG. 3 is a sectional view taken along line 3—3 of FIG. 2.
Figure 4:
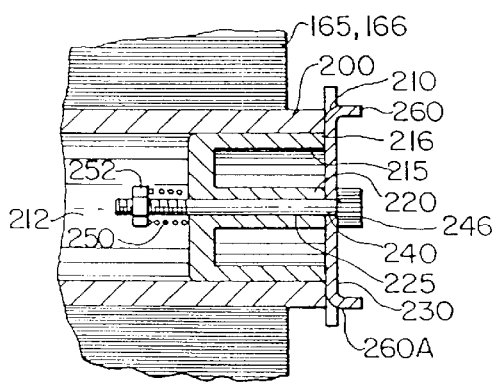
FIG. 4 is a sectional view taken along line 4—4 of FIG. 3.
Figure 5:
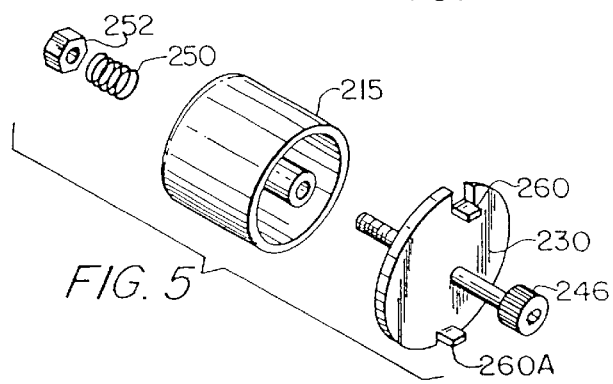
FIG. 5 is an exploded view of the tensioning cap associated with the supply rolls.

In FIGS. 3, 4 and 5, which figures are representative of the construction of the both ends of both feed rolls, the substrate material is shown wound about the feed roll core 200. The core 200 is a cylinder of cardboard or plastic having an end face 210. Core 200 has a hollow interior 212 which receives an end cap 215. The cap may be molded of plastic or other similar material having an interior outer wall 216. A boss 220 is concentrically formed in the cap with respect to the cylinder wall 216. Boss 220 defines an axial bore 225. The cap 215 is positioned slightly inwardly of the end of the core and may be adhesively secured to the interior wall 212 of the roll core 200.

A circular end plate 230 abuts the end of the core which plate has a diameter slightly greater than the diameter of the core. The end plate has a central aperture 240 which receives the threaded shaft of bolt 246. A spring 250 is interposed between the head of the bolt and the interior face of the cap 215. Nut 252 engages the threaded end of the bolt. The head of the bolt 246 bears against the exposed surface of the end plate 230 and the position of the nut along the shaft of the bolt determines the frictional resistance that exists between the interior surface of the end plate 230 and the end face of the core of the roller. This tension is pre-adjusted by the manufacturer to provide the proper roll tension depending upon the type of material on the roll, the size of the material, the thickness of the material and other factors. Mounting tabs 260 and 260A project outwardly from the end plate and are slidingly engageable in mounting slots 270, 270A and 272, 272A provided on the interior surfaces of the cartridge side walls.

Thus, it will be seen that inserting a supply of suitable feed substrate is easily accomplished. The user simply selects the appropriate cartridge 150 and positions the cartridge in the opening at the front side of the housing. As can be appreciated from the Figures, the structure defining the front side opening serves to mount the cartridge in its operative position. This structure thus may be referred to as cartridge mounting structure. The cartridge is locked in place in the housing in a vertical position by locking detent members 280. The feed rolls may be various types of stock such as clear laminates, paper or film for removing excessive adhesive or rolls of material having a loose adhesive coating and a release coating on the opposite surface. The feed tray 80 is inserted in a generally horizontal position in the opposite slots in the cartridge.

As mentioned above, the device may be used as a lamination device or as an adhesive transfer device. In the case of use as an adhesive transfer device, the lower feed roll which consists of a film carrying an easily transferable adhesive. The upper feed roll would typically be a web of flexible carrier material having release characteristics on a lower surface and adhesive coating on the other surface. With rolls of this type in position, the end of the web of the lower feed roll is extended over the lower nip roller. The upper feed roll, in the case of adhesive transfer, will consist of a web of material such as inexpensive paper or film, having an affinity for adhesive. The end of the web is extended between the nip rollers with the end of the web adhesively secured to the web of the master in the lower roll.

Referring to FIGS. 11 to 15, the master which is designated by the numeral 300 consists of a continuous sheet of material having an upper surface and a lower surface. The upper surface carries labels 310 which have been pre-printed. Obviously, the master can be any pre-printed document or series of documents which can be generated by the user, as for example on a computer. The labels 310 can be of varying size and shape and it is understood that the term "labels" as used herein is intended to be representative of printed materials of various types arranged on a flexible substrate.

The master is aligned on the feed tray with the leading free edge of the master positioned on the exposed adhesive surface of the lower feed stock material 166 at the nip roller interface (also referred to as a nip area). The slight forward protrusion of the lower nip roller 48 facilitates securing the master at this location. The web 165 of the upper feed roller is fed from the cartridge to the nip roller interface on the upper side of master 300.

The operator then actuates the machine by operating the crank which will rotate the upper nip roller and by means of the inter-engaging pinion gears, cause rotation of the lower nip roller. The rotation will also advance the upper web, the lower web and the master through the nip rollers and out the discharge side of the nip area. The master is smoothed, guided and wiped clean as it passes between the wiper 86 and the upper surface of the tray. As the master proceeds between the nip rollers in the interface nip area, the exposed adhesive 325 from the lower web will be transferred to the lower surface of the master 300. The upper web 165 will pick up any excessive adhesive not transferred to the master, as for example adhesive in the areas outside the perimeter of the label areas 310. The upper web should be wider than the adhesive web. The master may then be easily severed into individual labels or strips of labels by operating the cutter by means of the lever as the master emerges from the discharge opening at the rear of the machine.

Note that the master can be oriented with either printing or indicia facing upwardly or downwardly depending on the user's requirements.

For example, if the user is making labels which are to be applied to the inside of a window, the master would, in most cases, be fed into the applicator with the printing disposed downwardly so adhesive would be applied over the printed area 310. The apparatus can apply lamination to either top or bottom surfaces of a substrate or adhesive to the top or bottom surfaces of a substrate or to both surfaces. The device can also perform combination operations in applying of both the laminate and an adhesive to a substrate, the operation being determined by the selection of the cartridge and feed rolls within the cartridge that are inserted into the apparatus.

The characteristics of the lower web are such that the adhesive is a nonaggressive adhesive loosely adhered to the surface of the web. Thus, the lower web serves as a peelable cover which can be stripped away at the time the master is to be used by adhesively applying the master to a surface.

One significant advantage of the present invention is that the upper and lower feed rolls may be provided to the user pre-wound and properly tensioned so as not to overrun during operation. The proper tensioning is pre-set by the tensioning device described above.

While the principles of the invention have been made clear in the illustrative embodiments set forth above, it will be obvious to those skilled in the art to make various modifications to the structure, arrangement, proportion, elements, materials and components used in the practice of the invention. To the extent these various modifications do not depart from the spirit and scope of the appended claims, they are intended to be encompassed therein.

I claim:

1. A laminating and adhesive transfer apparatus to be used in conjunction with a removable cartridge for performing a laminating and adhesive transfer operation on a master, the cartridge having a pair of feed rolls rotatable mounted therein and a master feeding opening through which the master can be fed, each of the feed rolls supporting a supply of stock material, said apparatus comprising:

a frame having cartridge-mounting structure positioned and configured to removably receive the removable cartridge, said cartridge-mounting structure being configured such that the master feeding opening of the removable cartridge faces outwardly with respect to said frame when the removable cartridge is removably mounted on said cartridge-mounting structure;

a pair of nip rollers rotatably mounted within said frame and extending transversely between opposing sides thereof, said pair of nip rollers defining a nip area therebetween, said nip area having a feed side and a discharge side;

an actuating mechanism constructed and arranged to impart rotation to at least one of said pair of nip rollers, said nip rollers being configured to apply pressure to a master and stock material being fed therethrough as said nip rollers are rotated during a laminating or adhesive transfer operation; and said pair of nip rollers being constructed and arranged such that the master can be fed through the master feed opening of the removable cartridge and into said feed side of said nip area with the stock material unrolled from the feed rolls of the removable cartridge disposed on opposing sides of the master, said actuating mechanism imparting rotation to said at least one of said nip rollers to thereby feed the master and stock material through said nip area and discharge the master and stock material out said discharge side, said nip rollers applying pressure to the master and the stock material such that a selective laminating or adhesive transfer operation is performed on the master without the use of heat transfer as the master and stock material are fed through said nip rollers, said cartridge-mounting structure being configured such that the removable cartridge can be manually removed from said cartridge-mounting structure to thereby allow an operator to select a similar removable cartridge and mount it on said cartridge-mounting structure when replacement of the removable cartridge is desired.

2. The laminating and adhesive transfer apparatus of claim 1 further including a cutting device located adjacent at the discharge side of said nip rollers.

3. The laminating and adhesive transfer apparatus of claim 2 wherein said cutting device includes a transversely extending blade having a cutting edge operatively attached to a lever for moving said blade and an anvil bar whereby actuation of said cutting device moves said blade into engagement with said anvil bar to thereby sever a discharged master.

4. The laminating and adhesive transfer apparatus of claim 1 wherein said nip rollers are parallel to one another and wherein one of said nip rollers is displaced toward the feed side of the nip area relative to the other nip roller.

5. The laminating and adhesive transfer apparatus of claim 1 wherein said frame has a low friction surface at the discharge side of the nip area.

6. A laminating and adhesive transfer apparatus according to claim 1, wherein said cartridge-mounting structure is a cartridge-receiving opening in said frame, said cartridge-receiving opening being positioned and configured such that the removable cartridge can be removably inserted into said cartridge-receiving opening with said master feed opening thereof facing outwardly with respect to said frame.

7. The laminating and adhesive transfer apparatus of claim 6 including a feed tray removably mounted on said frame so as to extend rearwardly through the master feed opening of the removable cartridge and extending generally horizontal from said nip area.

8. The laminating and adhesive transfer apparatus of claim 7 further including a wiper extending transversely of said tray for smoothing, guiding and tensioning the master.

9. The laminating and adhesive transfer apparatus of claim 8 wherein said wiper includes a resilient surface and wherein said wiper surface is biased into contact with the feed tray.

10. The laminating and adhesive transfer apparatus of claim 9 wherein said resilient surface is a soft material selected from the group consisting of rubber, plastic and fabric.

11. The laminating and adhesive transfer apparatus of claim 9 wherein said wiper is mounted on a bar carried on an arm pivotal with respect to said tray.

12. A removable cartridge for use in a laminating and adhesive transfer apparatus having a frame with a cartridge-mounting structure and a pair of nip rollers rotatably mounted within the frame, said removable cartridge comprising:

a cartridge body structure;

a pair of feed rolls rotatably mounted within said cartridge body structure and extending in a transverse direction, said feed rolls each carrying a supply of stock material to be unrolled, said cartridge body structure having a master feed opening positioned to face outwardly with respect to the frame of the apparatus when said removable cartridge is removably mounted on the cartridge-mounting structure of the frame, said master feed opening being configured to allow a master to be fed therethrough and into the nip rollers when said removable cartridge is removably mounted on the cartridge-mounting structure of the apparatus, said feed rolls being constructed and arranged such that said stock material can be unrolled therefrom, be disposed on opposing sides of the master fed through said master feed opening, and then be fed together with the master into the nip rollers of the laminating and adhesive transfer apparatus when said removable cartridge is removably mounted on the cartridge-mounting structure such that the laminating and adhesive transfer apparatus can perform a laminating or adhesive transfer operation on the master, said cartridge body structure being configured such that a user can engage said cartridge body structure and removably mount said removable cartridge on the cartridge-mounting structure of the frame of the apparatus, said cartridge body structure being configured such that a user can engage said cartridge body structure when said cartridge is removably mounted on the cartridge-mounting structure of the frame of the apparatus and remove said removable cartridge therefrom so that said removable cartridge may be replaced with a similar removable cartridge when desired.

13. A removable cartridge according to claim 12, wherein said cartridge body structure has a pair of parallel side walls and parallel top and bottom walls, said feed rolls being mounted transversely between said side walls.

14. A removable cartridge according to claim 13, wherein said cartridge body structure has a rear wall extending between said side walls, said master feed opening being formed through said rear wall.

15. A removable cartridge according to claim 14, wherein said master feed opening is configured such that a feed tray can be inserted therein and mounted on the frame of the apparatus to thereby support the master as it is fed into the nip rollers.

16. A removable cartridge according to claim 15, wherein said feed rolls are pre-tensioned to control a rate at which said stock material is unrolled from said feed rolls.

17. A removable cartridge according to claim 16, wherein each of said feed rolls includes a braking assembly, each of said braking assemblies applying frictional force to opposing ends of a respective one of said feed rolls to thereby pre-tension said feed rolls.

18. A removable cartridge according to claim 12, wherein said stock material on each of said feed rolls is a supply of laminating material.

19. A removable cartridge according to claim 12, wherein said stock material on one of said feed rolls is a supply of release coated substrate having an adhesive coating and said stock material on another of said feed rolls is a supply of material having an affinity for the adhesive coating on said release coated substrate.

\* \* \* \* \*